3,335,099
STEAM TREATMENT OF THE MATRIX IN A CRYSTALLINE ALUMINO-SILICATE CATALYST COMPOSITE
Paul B. Weisz, Media, Pa., assignor to Mobil Oil Corporation, a corporation of New York
No Drawing. Filed Mar. 17, 1966, Ser. No. 535,011
4 Claims. (Cl. 252—455)

This application is a continuation-in-part of Ser. No. 242,373, filed Dec. 5, 1962, and now abandoned.

This invention relates to new catalysts, to methods for production and the use of same, and more particularly to catalyst composites and methods of producing them which are particularly useful for the conversion of hydrocarbons.

The tremendous over-all advancement which resulted from the development of catalytic cracking was found to be so beneficial to the petroleum industry that gigantic installations have been built during the past twenty-five years at a cost running into hundreds of millions of dollars.

Like so many advancements in the scientific field, catalytic cracking had not only its many economic advantages, but it also posed many problems, some of which have withstood constant attacks and have been recognized and accommodated in the commercial cracking systems as ultimately constructed.

One of the problems encountered from the very inception of the catalytic cracking art, and which has defied solution, at least at the origin of the trouble, is that "coke" is formed upon and contaminates the catalysts, thereby inhibiting the effectiveness thereof. "Coke" as formed during the cracking of hydrocarbons is usually considered empirically as carbon but it is, in the most part, very highly condensed, hydrogen-poor hydrocarbons.

Gas-oil charging stock, as fed to the catalytic cracking systems, has a lesser proportion of hydrogen to carbon than the gasoline and gaseous products produced by the cracking. It follows, therefore, that some material of a nature more deficient in the proportion of hydrogen to carbon comes into existence.

The formation of "coke" in the cracking of petroleum represents a very real economic loss. Furthermore, when "coke" is formed and contaminates the catalysts an operational loss occurs since the "coke" must be removed from the catalysts in order for the catalysts to be revitalized.

The normal catalytic cracking systems in use have had to deal with the contamination of the catalyst by the formation of "coke" thereon, and it has been the practice to regenerate the catalyst by burning off the "coke" as a part of a continuous cycle. Regeneration of the catalyst has proven to be an extremely complex procedure, requiring costly equipment. Not only must the "coke" be burned from the catalyst so as to leave it as clean as possible, but the cracking catalysts are susceptible to damage at temperatures likely to develop during uncontrolled burning, which damage susceptibility is aggravated by the presence of water vapor at high temperatures. Since water vapor arises from the combustion of hydrocarbons deposited upon the catalyst, adequate controlled purging or "stripping" of catalysts must be provided to remove any residual hydrocarbons other than "coke."

The problems involved in the burning off of the "coke" from the catalyst make it necessary to utilize elaborate arrangements to extract heat as formed from the relatively poor heat-transfer catalytic material, and heat transfer coils and the use of large amounts of excess air, or the recirculation of flue gas to dilute the incoming air have been utilized as expedients for this purpose.

In addition to the elaborate arrangements utilized to effect regeneration of the catalysts attention has been directed to the cracking cycle in an effort to avoid build-up of "coke" upon the catalyst in excess of about 2% by weight before regeneration thereof.

To permit the accumulation of more than about 2% of "coke" upon the catalysts may result in the release of heat so high as to be almost beyond control during regeneration, if the regeneration is conducted within a feasible time limit.

The problem of regenerating the catalyst is in fact so serious that catalytic cracking units now in existence are limited in their operating effiecency and capacity, not by the amount of charge that can be treated in the heater and reactor, but the capacity of the unit is directly restricted to the ability of the system to regenerate the catalyst by the removal of the "coke" therefrom.

Research in the art of the catalytic cracking of petroleum has not only been directed to more efficient means of regeneration of the catalyst, but much work has been done in connection with the improvement of catalysts per se. In this connection, as referred to above, those skilled in the art have been accustomed to expect important but relatively minor advances in the efficiency of catalysts. As distinguished from the type of advances which the art has been accustomed to expect, research with respect to catalysts during the recent past has uncovered a break-through totally unexpected and unpredicted which opens up a vast field in which the catalysts included therein have a relative activity of as high as ten thousand times that of the presently used catalysts. In fact, it has been found in the initial investigations of this new catalytic development that the catalysts are so active that they promote an effective barrier against their use in such active conditions in the presently existing commercial catalytic cracking equipment.

The problems encountered in this over-all development following the production of representative catalysts in this field, having such fantastic and unpredicted activity, have rendered the immediate use of such catalysts impossible on a commercial scale due to the limitations in the present petroleum conversion equipment. While it is contemplated that as the commercial conversion equipment is replaced the designs will be advanced and be capable of making full use of these new catalysts, treatments have been developed to render their use commercially feasible in existing equipment and in existing processes without awaiting further developments in the art. Such treatments involve the reduction of the activity of the catalysts to a level at which they may be immediately utilized with an effectiveness as high as the known equipment and processes may utilize but still at a level much higher than the commercial available catalysts now in use.

However, it has also been found that with the use of these highly active catalysts formation of "coke" is correspondingly accelerated and the uncontrolled formation of "coke" makes it substantially impossible to regenerate the catalysts, or at least to regenerate the catalysts in available equipment.

This invention is therefore directed to a process involving the use of the highly active catalysts reduced to an activity generally adaptable for use in present-day systems, but in which the step of reaction is controlled so as to inhibit the formation of "coke" at this point of origin of the problem.

As indicated in co-pending application Ser. No. 208,512, filed July 9, 1962, new catalysts have now been discovered which have a relative activity of as high as 10,000 times that of presently used catalysts in the cracking of hydrocarbons. This fantastic and unpredicted super activity has rendered impossible the immediate use of such catalysts on a commercial scale for catalytic cracking of hydrocarbons due to the limitations in the present petroleum conversion equipment. Yet these materials exhibit product selectivity which is extremely attractive, since the ratio of gasoline yield to coke make in gas oil cracking has been found to be markedly better than that of conventional catalysts.

Product selectivity is a measure of the ability of a conversion process to make wanted product, gasoline, without unduly producing unwanted produce, gas and coke. It may be expressed as an index. A convenient index may be had by dividing weight percent of coke produce by volume percent of gasoline produced in the same conversion. Care must be taken in the use of this coke/gasoline index to apply it only to operations wherein the level of conversion is reasonably equal.

It has thus been found to be necessary for use on existing equipment and in existing processes to reduce the activity of such catalysts to a level at which it may be immediately used with an effectiveness as high as the known equipment and processes may utilize, but still at a level much higher than the commercially available catalysts now in use.

One such method of reducing the activity of such catalysts is by dilution in a matrix of controlled activity or of little or no activity. When such superactive catalysts are combined with relatively large percentages of a diluting matrix to form a composite, it has been found that the character of the matrix affects the product selectivity and usefulness of the composite. It has now been found desirable that the matrices have a relatively low catalytic activity, and more importantly, that the pore diameter thereof must be relatively large to permit access of the reactants to the superactive catalysts therein.

It is therefore an object of the present invention to provide a novel method of preparation of a catalyst composite wherein the matrix has a relatively low catalytic activity and a relatively large pore diameter.

It is a further object of the present invention to provide a novel composite catalyst having a superactive catalyst dispersed in a matrix wherein the matrix has a relatively low catalytic activity and a relatively large pore diameter.

It is still a further object of the present invention to provide a novel process for the conversion of hydrocarbons utilizing these novel composite catalysts.

Catalysts of differing types differ not only in such things as activity and regenerability, but also in type of products produced. For example, many of the superactive materials produce less olefins and more isomeric materials than do conventional silica-alumina amorphous catalysts. In a composite catalyst, the nature of the product is the result of the action of both ingredients of the catalyst and since the products of cracking over the superactive component are in general more desirable than those from the matrix materials, it is quite desirable that the matrix not limit or hinder the feed material from coming in contact with the superactive component.

It has now been found that by treatment in accordance with the present invention the matrix can be readily converted to one having a low catalytic activity with large pore diameters which permit maximum benefit of the superactive component of the catalyst composite.

The present invention is concerned with an aqueous treatment of a matrix material at elevated pressures and relatively low temperatures so as to increase the pore diameters thereof. This treatment, hereinafter referred to as "hydrothermal treatment" serves to greatly improve the characteristics of the resulting composite due to the fact that as a result of increased pore diameters the gas-oil is more easily allowed to come in contact with the superactive component and be cracked.

The hydrothermal treatment of the matrix is employed either prior to addition of the active component or after the composite of the matrix-superactive material has been made. The superactive component in the composite is usually stable to such treatment. The treating medium may be water, steam, or an aqueous solution at temperatures and pressures preferably permitting the existence of liquid water. Temperatures between about 200° F. and the critical temperature of water (706.1° F. at 3,226 lbs. absolute) are preferred for a period of time adequate to decrease the activity of the matrix to the extent desired.

This hydrothermal treatment not only increases the pore sizes of the matrix but also acts to kill its less selective cracking action on hydrocarbons and the result is a reduction of the coke formation capability of the catalyst composite.

Among the matrix materials which may be used are the hydrous oxide type such as silica-alumina, silica-magnesia, silica-zirconia, silica-thoria, silica-titania, silica-beryllia, silica gel, alumina, clay, e.g. attapulgite, kaolin, sepiolite, polygarskite, kaolinite, plastic ball clays, bentonite, montmorillonite, illite, halloysite, chlorite, and the like. Such matrix materials after treatment, in accordance with this invention, usually have a catalytic activity of less than 30 AI and preferably less than 20 AI by the "Cat. A" activity test. In this test, a specified Light East Texas gas oil is cracked by passage over the catalyst in a fixed bed, at a liquid hourly space velocity of 1.0, using a catalyst-to-oil ratio of 4/1, at an average reactor temperature of 875° F., and atmospheric pressure. The percentage of gasoline produced is the Activity Index (AI). (National Petroleum News, 36, page R–537, Aug. 2, 1944.)

The proportion of matrix in the composite can be varied from 10–99 weight percent of the composite, thus utilizing from 1–90 weight percent of the superactive catalyst. A preferred range of proportions is from 25–97 weight percent matrix and 3–75 weight percent of the superactive catalyst. In one application, for use with existing plant facilities, a composite catalyst has been used in which the matrix is 96.5% and the active component only 3.5 weight percent of the composite.

Generally, the superactive catalysts with which this invention is concerned are basically alumino-silicates of ordered internal structure. These materials are possessed of very high surface per gram and are microporous. The ordered structure gives rise to a definite pore size, related to the structural nature of the ordered internal structure, Several forms are commercially available. A 5 A. material indicates a material of A structure and a pore size of about 5 A. diameter. A 13X material is one of X structure and 10–13 A. pore diameter, and so on. There are also known synthetic faujasites termed "Y" zeolites and others. Many of these materials may be converted to the "H" or acid form. For example, such a conversion may be had by ion-exchange with an ammonium ion, followed by heating to drive off $NH_3$ or by controlled acid leaching. In general, the H form is more stable in materials having higher Si/Al ratios, such as 2.5/1 and above.

One material of high activity is H Mordenite. Mordenite is a material occurring naturally as the hydrated sodium salt corresponding to:

$$Na_8(AlO_2)_8(SiO_2)40.24H_2O$$

This Mordenite material may be leached with dilute hydrochloric acid to arrive at an H or acid form. In a specific example, the Mordenite material may be so treated as to have more than 50% in the acid from.

Another type of high activity catalyst may be prepared by using Linde 13X molecular sieve, which is described in U.S. Patent 2,882,244. This material may be base exchanged with a solution of rare-earth chlorides (containing 4% of $RECl_3.6H_2O$) at 180–200° F. to remove sodium ions from the alumino-silicate complex and replace at least some of them with the chemical equivalent of rare earth ions. After washing free of soluble material and drying, there is produced an REX alumino-silicate containing 1.0–1.5% (wt.) of sodium and about 25% (wt.) of rare earth ions calculated as $RE_2O_3$.

Similar preparations of high activity may be made by suitable preparation of a variety of crystalline alumino-silicates, such as Y-zeolites, gmelinite, chabazite, and the like.

According to the invention, the aluminosilicate active component of the composite may be varied within wide limits as to alumino-silicate employed, cation character and concentration, and added components in the pores thereof incorporated by precipitation, adsorption and the like. Particularly important variables are silica to alumina ratio, pore diameter and spatial arrangement of cations. The cations may be protons (acid) derived by base exchange with solutions of acids or ammonium salts, the ammonium ion decomposing on heating to leave a proton. Polyvalent metals may be supplied as cations, as such or as spacing agents in acid aluminosilicates for stabilization.

Other crystalline aluminosilicates which can be employed are those set forth in U.S. 3,140,249, 3,140,251, 3,140,252, 3,140,253 and 3,210,267. In general, it is preferred that the total alkali metal content of the composite of superactive component and matrix be less than 1% by weight if the superactive component has a silicon to aluminum ratio of less than about 1.5. In those cases wherein a crystalline aluminosilicate is used which has a silicon to aluminum atomic ratio greater than 1.5, the alkali metal content should be less than 4% and preferably less than 3% by weight.

Additionally, crystalline aluminosilicates having pore sizes at at least about 6 Angstrom units and even more desirably from 10–13 Angstrom units, are particularly preferred.

The above discussed catalysts possess activities too great to be measured by the "Cat. A" test discussed above. To measure their activity there has been developed a micro test method in which these catalysts are compared for relative cracking activity in the cracking of hexane with a conventional catalyst. This method and a fuller discussion of the development of the measure of activity is fully disclosed in copending application Ser. No. 208,512 filed July 9, 1962. As there explained, alpha is the measure of the comparative conversion ability of a particular superactive catalyst of the type above discussed when compared in the conversion of hexane with a conventional silica-alumina cracking catalyst (90% $SiO_2$—10% $AlO_2$) having an activity index as measured by the "Cat. A" test of 46.

Many such superactive catalysts have been found to have an alpha value of the order of about 10,000, where alpha is the comparative activity of the catalyst based upon conventional amorphous silica-alumina cracking catalyst as $\alpha \approx 1$.

In order to use such catalysts with conventional commercial equipment and processes now available, particularly in the cracking of hydrocarbons, it is first necessary to reduce the activity of such superactive catalysts.

One method for the adjustment of activity may be referred to as steam-killing, or more shortly, steaming. It has been found that steaming can effect major degradation of the activity of the superactive catalysts utilized herein, and that controlled steaming can be utilized to acquire any desired degree of activity reduction. For example, a crystalline alumino-silicate of the 13X type which has been base-exchanged with a mixture of rare-earth chlorides has a relative activity $\alpha \approx$, when freshly prepared of about 10,000. By controlled steaming in an atmosphere of steam for 5–40 hours, at 1300° F., its relative activity can be reduced to an $\alpha \approx$ of about 10.

Another method of modifying such catalysts to reduce their activity is by dilution in a matrix of controlled activity or of little or no activity.

Thus, through combinations of the various methods of adjusting activity of the superactive catalytic materials, any desired relative activity can be obtained. For example, the freshly prepared RE 13X of relative activity $\alpha \approx 10,000$, which was reduced by steaming to a material of $\alpha \approx 10$, can be further reduced by compounding with an equal amount of catalytically inert material to an activity, $\alpha \approx 5$.

A catalyst such as RE 13X of $\alpha \approx 10,000$ may be reduced by steaming to reduce it to a $\alpha \approx$ of approximately 10 and thereafter reduced readily to an activity useful in today's technology by incorporating in a matrix of amorphous silica-alumina; for example, of an activity of $\alpha \approx 1.5-2.0$.

As has heretofore been stated, the size of the pores of the matrix is of the utmost importance since, quite obviously, the reactants must be capable of coming in contact with the superactive material distributed throughout the matrix in order for these catalysts to be effective.

The primary purpose of the instant invention is to increase the pore diameters of the matrix material being treated, although in the majority of cases, the activity of the matrix is also reduced. It is to be understood, however, that the reduction of activity of the matrix is not absolutely essential for the purpose of this invention. Thus, the present invention gives good results when treating a matrix which has substantially no catalytic cracking activity at all, i.e., a silica gel. The hydrothermal treatment of this invention acts to increase the average pore diameter of the silica gel and, thus, improve the cracking characteristics of the resulting composite catalyst, although its activity is substantially unchanged.

The pore size of the matrix can be controlled by the treatment in accordance with this invention. A hydrous oxide matrix such as silica-alumina amorphous matrix may be treated by contact with water, either in the liquid or vapor phase, at elevated temperatures to obtain the desired pore size. Broadly, the invention involves treating temperatures preferably between from about 200° F. up to the critical temperature of water. (706.1° F. at 3,226 lbs.) Temperatures up to 1000° F. can be used for certain materials. The preferred vapor pressure of the water is from 100–3000 lbs. per sq. inch gauge and the time may vary from about one minute upward to 100 hours and longer and is usually from 15 minutes to six hours.

The matrix resulting from the present hydrothermal treatment should have average pore diameters of between 180–6000 A., which corresponds to a surface area of between about three to about 100 m.$^2$/g., and preferably about 360–6000 A., corresponding to about 3 to about 50 m.$^2$/g. of surface area, and a catalytic activity determined by the Cat. A test of less than 30 AI and preferably less than 20 AI. The resulting composite catalyst utilizing this matrix can contain from 1–90 percent by weight of the superactive catalyst. The resulting composite catalyst can be made by first hydrothermally treating the matrix, followed by pelleting with the active components, or the superactive material may be added to the matrix and pelleted prior to the hydrothermal treatment. A calcining treatment can follow the hydrothermal treatment if such is desired. In case the final catalyst form is to be a bead, the superactive material is introduced into the matrix in gel form prior to formation of the bead, and the bead is then subjected to the desired intermediate treatment, such as base exchange to remove sodium and the like, followed by the hydrothermal treatment.

As a specific example, a crystalline alumino-silicate material having an activity of α≈ of 10,000 is first steamed at 1300° F. for 40 hours to reduce its activity to α≈10. This material is then incorporated in a matrix of hydrogel in the manner of Patent No. 2,964,481, the hydrogel being a silica-alumina hydrogel, to arrive at beads containing 3.5 parts by weight of superactive material to 96.5 parts by weight of matrix. The activity of this resulting catalyst is α≈1.5. The matrix before hydrothermal treatment had an average pore diameter of 50 Angstrom units, corresponding to a surface area of 340 m.²/g. The composite catalyst was hydrothermally treated for one hour with water at a temperature of 600° F. and a water vapor pressure of 1500 pounds per square inch. At the conclusion of the conventional calcining and finishing treatment, the resulting matrix was found to have an average pore diameter of 560 square meters per gram.

When the temperature of treatment was reduced to 400° F. at the same pressure and time of treatment, the matrix was found to have an average pore diameter of 250 Angstrom units. By varying the water vapor pressure, temperature and time of treatment, the average pore diameters of the hydrous oxide solid can be controlled.

It has been further found that excellent results can be obtained by including certain electrolytes in the water used for the hydrothermal treatment. These electrolytes can be incorporated in any concentration up to saturation; however, 1–10% has been found to be the most useful range. Electrolytes, including salts which may yield $NH_4^\pm$, $Ca^{++}$, $Na^+$, $Ag^+$ or like ions, or may yield $OH^-$ in the water, assist in the increase in pore diameters of the matrix, act to reduce the activity of the matrix, and also can be used to accomplish base exchange with the superactive component concurrently. If the resulting catalyst is not compatible with the end use intended, then the cations added can be later taken out by further base exchange. Ammonium salts, for example, which act to severely alter the matrix in the desired manner without substantial effect on the active ingredient other than base exchange are ammonium hydroxide, ammonium carbonate and ammonium acetate. If ammonium ions are undesirable on the finished catalyst, the ammonium may be removed by base exchange against a desirable cation. The hydrothermal treatment of this invention acts on the matrix to simultaneously enlarge its pores and reduce its surface area. This treatment leaves the active aluminosilicate portion of the catalyst with a very substantial portion of its activity.

It is to be specifically understood that this invention is not directed towards the broad concept of steaming a composite of a superactive crystalline aluminosilicate and a matrix, but rather, is directed towards a very specific hydrothermal treatment. In fact, the concept of steaming a crystalline aluminosilicate is disclosed and claimed in U.S. 3,140,249. This invention is directed towards a very specific treatment for the purpose of enlarging the pore size of a matrix in order to enable the resulting composite to be a more effective conversion catalyst due to the fact that the feed material will be more easily accessible to the superactive component.

In general, the composite catalyst made in accordance with the present invention may be used in catalytic cracking operations such as a compact moving bed or in a fluidized operation. The general operating conditions cover a wide range, Thus, temperatures may vary over an approximate range of 550–1100° F. preferably 700–950° F. under pressures ranging from subatmospheric pressure up to several hundred atmospheres. Other parameters of cracking operations are space velocity and catalyst to oil ratio. These may be expressed upon either a volume or a weight basis. Upon a volume basis LHSV, is defined as cubic feet of liquid oil at 60° F. charged per hour per cubic foot of reactor occupied by catalyst. Catalyst to oil ratio upon a volume basis is the cubic feet of oil (60° F.) charged to the reactor per hour. Volume basis ratios are normally used in speaking of moving bed operations while weight basis ratios are more appropriate for fluidized operations. Conversion from one basis to another may be made readily. For a moving bed operation with catalytic materials of the type spoken of above with a relatively inert matrix and a total activity of the composite catalyst in the range of 1.5 to 10 LHSV, conditions may range from about 0.2 to about 4.0 and upwards, while catalyst oil ratios may range from about 1 to 8 and upwards.

It will be seen that it is now possible to prepare composite catalysts having a superactive component distributed throughout the pores of a relatively inert matrix with controlled average pore diameter as well as activity by use of the present process. The use of such a catalyst is of considerable value in hydrocarbon conversion processes for many reasons. Any material with catalytic activity will not only produce a desired conversion, but will also produce and become contaminated by coke. With a given matrix material having activity and a superactive ingredient therein present, there are contributions to coke production by both components.

Similarly, both may affect product quality such as octane number and certainly product yields. In connection with the above, it should appear quite obvious that the ability of the feed as well as the products to come in contact or be released by the superactive component is a controlling factor. Therefore, in order to optimize a given over-all conversion operation, this invention enables one to exert a positive control over both the activity of the matrix and the accessability of the feed and products to the superactive component.

The following example will illustrate the novel process of this invention.

*Example*

A silica-alumina matrix was prepared by cogellation of hydrous silica and alumina and thereafter calcined at 1000° F. for 10 hours.

A synthetic crystalline aluminosilicate identified as zeolite Y was contacted with a solution of rare earth ions and thereafter, washed with water and treated with steam for 24 hours at 1225° F. and 15 p.s.i.g.

The above two materials were then used to prepare two different catalysts according to the following procedure:

*Catalyst A.*—The above described silica-alumina was subjected to a conventional steaming operation which consisted of treatment with steam at 1300° F. and atmospheric pressure for six hours. This treatment reduced the surface area of the silica-alumina from 482 m.²/g. to 167 m.²/g. A composite catalyst was then made from the steamed matrix and the crystalline aluminosilicate as follows:

(a) A portion of the steam matrix was ball-milled sufficiently to powder it.

(b) To the powdered matrix a quantity of the highly active aluminosilicate was added such that the aluminosilicate constituted 5.54 percent of the total by weight. The composite was then milled for one hour to thoroughly mix with the two components.

(c) The finely powdered composite was pelleted, crushed, and screened to obtaining a quantity of 40–60 mesh catalyst which was then evaluated for cracking activity.

*Catalyst B.*—The silica-alumina matrix above described was subjected to a hydrothermal treatment in accordance with the process of this invention. In this regard, the silica-alumina matrix was treated for 6 hours at 700° F. at a water vapor pressure of 1000 p.s.i.g. This treatment reduced the surface area of the matrix from 482 m.²/g. to 24 m.²/g. Catalyst B was then prepared in a manner identical to the procedure used for preparing Catalyst A.

Cracking experiments were then conducted on Catalysts A and B in a fixed-bed flow reactor at 900° F. The charge was a Wide Cut Mid-Continent Gas Oil. The experimental conditions and the results obtained are tabulated below.

| Run Conditions | Catalyst A | | Catalyst B | |
|---|---|---|---|---|
| WHSV, $W_o/Hr.-W_c$: | | | | |
|   Total catalyst | 6.26 | 2.12 | 1.2 | 0.8 |
|   Aluminosilicate catalyst | 113 | 38 | 21 | 14.5 |
| Catalyst on-stream-time, min | 10 | 10 | 10 | 10 |
| Selectivity Results, wt. percent: | | | | |
|   Dry Gas | 4.5 | 12.8 | 8.0 | 11.8 |
|   Butanes | 5.1 | 6.2 | 7.1 | 9.1 |
|   $C_5^+$ Gasoline | 37.1 | 46.1 | 45.8 | 46.9 |
|   Cycle Stock | 51.8 | 29.2 | 35.5 | 26.4 |
|   Coke | 1.5 | 5.7 | 3.6 | 5.8 |
| | 100.0 | 100.0 | 100.0 | 100.0 |

The above data clearly demonstrates the improved results obtained by using the catalyst prepared according to the novel process of this invention in that Catalyst B gives less coke and less dry gas than Catalyst A when compared at equal conversion.

What is claimed:

1. A process for preparing a composite catalyst of a superactive crystalline aluminosilicate dispersed in a relatively inert porous inorganic oxide matrix which comprises decreasing the surface area of said matrix by a hydrothermal treatment at a temperature between 200° F. and the critical temperature of water at a pressure of 100–3000 p.s.i. for a period of time adequate to decrease the surface area thereof to 3–100 m.$^2$/g. and thereafter adding to said treated matrix said superactive crystalline aluminosilicate so as to obtain a catalyst composite.

2. A process according to claim 1 wherein said hydrothermal treatment is conducted by contacting the composite catalyst with water containing base exchange cations which act to increase the pore diameters of the matrix and to accomplish base exchange with the superactive component simultaneously.

3. The process of claim 1 wherein the catalyst composite has a total sodium content of less than 4 percent by weight.

4. The process of claim 1 wherein the catalyst composite has a total sodium content of less than 1 percent by weight.

References Cited

UNITED STATES PATENTS

| 2,982,719 | 5/1961 | Gilbert et al. | 208—120 |
| 3,140,249 | 7/1964 | Plank et al. | 208—120 |
| 3,257,310 | 6/1966 | Plank et al. | 208—120 |

DELBERT E. GANTZ, *Primary Examiner.*

ABRAHAM RIMENS, *Examiner.*